US008613988B2

(12) United States Patent
Williams

(10) Patent No.: US 8,613,988 B2
(45) Date of Patent: Dec. 24, 2013

(54) IMAGE TRANSFER MATERIAL AND POLYMER COMPOSITION

(71) Applicant: MJ Solutions GmbH, Plymouth, MN (US)

(72) Inventor: Scott Williams, Plymouth, MN (US)

(73) Assignee: MJ Solutions GmbH, Plymouth, MN (US)

( * ) Notice: Subject to any disclaimer, the term of this patent is extended or adjusted under 35 U.S.C. 154(b) by 0 days.

(21) Appl. No.: 13/668,672

(22) Filed: Nov. 5, 2012

(65) Prior Publication Data

US 2013/0056137 A1 Mar. 7, 2013

Related U.S. Application Data

(60) Continuation of application No. 13/005,849, filed on Jan. 13, 2011, now Pat. No. 8,334,030, which is a division of application No. 10/589,022, filed as application No. PCT/US2005/000386 on Feb. 9, 2005, now abandoned.

(60) Provisional application No. 60/542,886, filed on Feb. 10, 2004, provisional application No. 60/616,650, filed on Oct. 8, 2004.

(51) Int. Cl.
*B41M 5/00* (2006.01)
*B41M 5/50* (2006.01)
*B41M 5/52* (2006.01)
*B41M 5/44* (2006.01)
*B41M 3/12* (2006.01)
*C09J 7/02* (2006.01)

(52) U.S. Cl.
CPC .................. *B41M 5/504* (2013.01); *B41M 5/52* (2013.01); *B41M 5/5254* (2013.01); *B41M 5/44* (2013.01); *B41M 5/5218* (2013.01); *B41M 3/12* (2013.01); *C09J 7/0242* (2013.01); *C09J 7/025* (2013.01)
USPC .................. 428/32.22; 428/32.78; 428/32.79; 428/206; 428/346; 428/352

(58) Field of Classification Search
CPC ...... B41M 5/504; B41M 5/52; B41M 5/5254; B41M 3/12; B41M 5/44; B41M 5/5218; C09J 7/0242; C09J 7/025
USPC .......... 428/32.22, 32.78, 32.79, 206, 346, 352
See application file for complete search history.

(56) References Cited

U.S. PATENT DOCUMENTS 3,222,419 A 12/1965 Jubilee et al.
3,257,478 A 6/1966 Jubilee, Jr. et al.
(Continued)

FOREIGN PATENT DOCUMENTS

DE 4432383 C1 11/1995
EP 466503 A1 1/1992
(Continued)

OTHER PUBLICATIONS

U.S. Appl. No. 10/589,022, filed Mar. 8, 2007, Image Transfer Material and Polymer Composition.
(Continued)

*Primary Examiner* — Betelhem Shewareged
(74) *Attorney, Agent, or Firm* — Schwegman Lundberg Woessner P.A.

(57) ABSTRACT

Provided is an image transfer material, comprising a support, optionally at least one barrier layer, a melt transfer layer, and an image receiving layer. Also provided is a process for preparing the image transfer material. Further provided is a heat transfer process using the disclosed material. In the heat transfer process, after imaging, the image receiving layer and melt transfer layer are peeled away from the optionally barrier-coated support material and placed, preferably image side up, on top of a receptor element. A non-stick sheet is then optionally placed over the imaged peeled material and heat is applied to the top of the optional non stick sheet. The melt transfer layer then melts and adheres the image to the receptor element. A composition comprising: at least one self-crosslinking polymer, and at least one dye retention aid.

12 Claims, 2 Drawing Sheets

(56) References Cited

U.S. PATENT DOCUMENTS

| | | |
|---|---|---|
| 3,658,570 A | 4/1972 | Crooks et al. |
| 3,790,439 A | 2/1974 | La Perre et al. |
| 3,922,435 A | 11/1975 | Asnes |
| 3,936,542 A | 2/1976 | Cox |
| 4,021,591 A | 5/1977 | De Vries et al. |
| 4,102,456 A | 7/1978 | Morris |
| 4,169,169 A | 9/1979 | Kitabatake |
| 4,189,395 A | 2/1980 | Bland |
| 4,224,358 A | 9/1980 | Hare |
| 4,235,657 A | 11/1980 | Greenman et al. |
| 4,284,456 A | 8/1981 | Hare |
| 4,322,467 A | 3/1982 | Heimbach et al. |
| 4,337,289 A | 6/1982 | Reed et al. |
| 4,351,871 A | 9/1982 | Lewis et al. |
| 4,399,209 A | 8/1983 | Sanders et al. |
| 4,461,793 A | 7/1984 | Blok et al. |
| 4,477,622 A | 10/1984 | Sanderson et al. |
| 4,548,857 A | 10/1985 | Galante |
| 4,549,824 A | 10/1985 | Sachdev et al. |
| 4,555,436 A | 11/1985 | Geurtsen et al. |
| 4,594,276 A | 6/1986 | Relyea |
| 4,685,984 A | 8/1987 | Powers et al. |
| 4,726,979 A | 2/1988 | Chapman |
| 4,758,952 A | 7/1988 | Harris et al. |
| 4,773,953 A | 9/1988 | Hare |
| 4,863,781 A | 9/1989 | Kronzer |
| 4,869,957 A | 9/1989 | Vankerckhoven et al. |
| 4,880,678 A | 11/1989 | Goffi |
| 4,966,815 A | 10/1990 | Hare |
| 4,980,224 A | 12/1990 | Hare |
| 5,019,475 A | 5/1991 | Higashiyama et al. |
| 5,028,028 A | 7/1991 | Yamada et al. |
| 5,045,383 A | 9/1991 | Maeda et al. |
| 5,059,580 A | 10/1991 | Shibata et al. |
| 5,097,861 A | 3/1992 | Hopkins et al. |
| 5,104,719 A | 4/1992 | Kamen et al. |
| 5,110,389 A | 5/1992 | Hiyoshi et al. |
| 5,133,819 A | 7/1992 | Croner |
| 5,139,917 A | 8/1992 | Hare |
| 5,163,247 A | 11/1992 | Weber et al. |
| 5,217,793 A | 6/1993 | Yamane et al. |
| 5,236,801 A | 8/1993 | Hare |
| 5,242,739 A | 9/1993 | Kronzer et al. |
| 5,242,781 A | 9/1993 | Ohbayashi et al. |
| 5,252,531 A | 10/1993 | Yasuda et al. |
| 5,271,990 A | 12/1993 | Kronzer et al. |
| 5,334,439 A | 8/1994 | Kawaguchi et al. |
| 5,350,474 A | 9/1994 | Yamane |
| 5,362,703 A | 11/1994 | Kawasaki et al. |
| 5,366,837 A | 11/1994 | Sakai |
| 5,370,132 A | 12/1994 | Weber et al. |
| 5,372,884 A | 12/1994 | Abe et al. |
| 5,400,246 A | 3/1995 | Wilson et al. |
| 5,407,724 A | 4/1995 | Mimura et al. |
| 5,431,501 A | 7/1995 | Hale et al. |
| 5,434,598 A | 7/1995 | Shimomine et al. |
| 5,441,056 A | 8/1995 | Weber et al. |
| 5,501,902 A | 3/1996 | Kronzer |
| 5,521,229 A | 5/1996 | Lu et al. |
| 5,603,996 A | 2/1997 | Overcash et al. |
| 5,612,168 A | 3/1997 | Ishikawa |
| 5,614,345 A | 3/1997 | Gumbiowski et al. |
| 5,620,548 A | 4/1997 | Hare |
| 5,665,476 A | 9/1997 | Oez |
| 5,665,479 A | 9/1997 | Vandamme et al. |
| 5,678,247 A | 10/1997 | Vickers |
| 5,707,925 A | 1/1998 | Akada et al. |
| 5,741,387 A | 4/1998 | Coleman |
| 5,759,738 A | 6/1998 | Tsuno et al. |
| 5,770,268 A | 6/1998 | Kuo et al. |
| 5,798,161 A | 8/1998 | Kita et al. |
| 5,798,179 A | 8/1998 | Kronzer |
| 5,821,028 A | 10/1998 | Maejima et al. |
| 5,833,790 A | 11/1998 | Hare |
| 5,861,355 A | 1/1999 | Olson et al. |
| 5,882,388 A | 3/1999 | Adair et al. |
| 5,905,497 A | 5/1999 | Vaughan et al. |
| 5,917,730 A | 6/1999 | Rittie et al. |
| 5,925,712 A | 7/1999 | Kronzer |
| 5,942,335 A | 8/1999 | Chen et al. |
| 5,948,586 A | 9/1999 | Hare |
| 5,962,149 A | 10/1999 | Kronzer |
| 5,981,045 A | 11/1999 | Kuwabara et al. |
| 5,981,077 A | 11/1999 | Taniguchi |
| 6,017,611 A | 1/2000 | Cheng et al. |
| 6,033,739 A | 3/2000 | Kronzer |
| 6,033,824 A | 3/2000 | Hare et al. |
| 6,036,808 A | 3/2000 | Shaw-Klein et al. |
| 6,042,914 A | 3/2000 | Lubar |
| 6,054,223 A | 4/2000 | Tsuchiya et al. |
| 6,066,387 A | 5/2000 | Ueda et al. |
| 6,071,368 A | 6/2000 | Boyd et al. |
| 6,083,656 A | 7/2000 | Hare et al. |
| 6,087,061 A | 7/2000 | Hare et al. |
| 6,090,520 A | 7/2000 | Hare et al. |
| 6,096,475 A | 8/2000 | Hare et al. |
| 6,106,982 A | 8/2000 | Mientus et al. |
| 6,113,725 A | 9/2000 | Kronzer |
| 6,120,888 A | 9/2000 | Dolsey et al. |
| 6,139,672 A | 10/2000 | Sato et al. |
| 6,177,187 B1 | 1/2001 | Niemoller et al. |
| 6,180,256 B1 | 1/2001 | Sargeant |
| 6,200,668 B1 | 3/2001 | Kronzer |
| 6,228,543 B1 | 5/2001 | Mizuno et al. |
| 6,242,082 B1 | 6/2001 | Mukoyoshi et al. |
| 6,245,710 B1 | 6/2001 | Hare |
| 6,258,448 B1 | 7/2001 | Hare |
| 6,265,128 B1 | 7/2001 | Hare et al. |
| 6,294,307 B1 | 9/2001 | Hare |
| 6,331,374 B1 | 12/2001 | Hare et al. |
| 6,338,932 B2 | 1/2002 | Hare et al. |
| 6,340,550 B2 | 1/2002 | Hare et al. |
| 6,358,660 B1 | 3/2002 | Agler et al. |
| 6,383,710 B2 | 5/2002 | Hare et al. |
| 6,423,466 B2 | 7/2002 | Hare |
| 6,428,878 B1 | 8/2002 | Kronzer |
| 6,450,633 B1 | 9/2002 | Kronzer |
| 6,495,241 B2 | 12/2002 | Sato et al. |
| 6,497,781 B1 | 12/2002 | Dalvey et al. |
| 6,506,445 B2 | 1/2003 | Popat et al. |
| 6,509,131 B2 | 1/2003 | Hare et al. |
| 6,521,327 B1 | 2/2003 | Franke |
| 6,531,216 B1 | 3/2003 | Williams et al. |
| 6,539,652 B1 | 4/2003 | Barry |
| 6,551,692 B1 | 4/2003 | Dalvey et al. |
| 6,582,803 B2 | 6/2003 | Cole et al. |
| 6,638,604 B1 | 10/2003 | Bamberg et al. |
| 6,638,682 B2 | 10/2003 | Hare et al. |
| 6,667,093 B2 | 12/2003 | Yuan et al. |
| 6,677,009 B2 | 1/2004 | Boyd et al. |
| 6,703,086 B2 | 3/2004 | Kronzer et al. |
| 6,723,773 B2 | 4/2004 | Williams et al. |
| 6,753,050 B2 | 6/2004 | Dalvey et al. |
| 6,786,994 B2 | 9/2004 | Williams et al. |
| 6,849,312 B1 | 2/2005 | Williams |
| 6,869,910 B2 | 3/2005 | Williams et al. |
| 6,871,950 B2 | 3/2005 | Higuma et al. |
| 6,875,487 B1 | 4/2005 | Williams et al. |
| 6,878,423 B2 | 4/2005 | Nakanishi |
| 6,884,311 B1 | 4/2005 | Dalvey et al. |
| 6,916,589 B2 | 7/2005 | Hare et al. |
| 6,916,751 B1 | 7/2005 | Kronzer |
| 6,951,671 B2 | 10/2005 | Mukherjee et al. |
| 6,998,211 B2 | 2/2006 | Riley et al. |
| 7,001,649 B2 | 2/2006 | Wagner et al. |
| 7,008,746 B2 | 3/2006 | Williams et al. |
| 7,021,666 B2 | 4/2006 | Hare |
| 7,022,385 B1 | 4/2006 | Nasser |
| 7,026,024 B2 | 4/2006 | Chang et al. |
| 7,081,324 B1 | 7/2006 | Hare et al. |
| 7,160,411 B2 | 1/2007 | Williams et al. |
| 7,220,705 B2 | 5/2007 | Hare |
| 7,238,410 B2 | 7/2007 | Kronzer |
| 7,361,247 B2 | 4/2008 | Kronzer |

(56) References Cited

U.S. PATENT DOCUMENTS

| | | | |
|---|---|---|---|
| 7,364,636 | B2 | 4/2008 | Kronzer |
| 7,749,581 | B2 | 7/2010 | Nasser et al. |
| 7,943,214 | B1 | 5/2011 | Bamberg et al. |
| 8,334,030 | B2 | 12/2012 | Williams |
| 2001/0051265 | A1 | 12/2001 | Williams et al. |
| 2002/0025208 | A1 | 2/2002 | Sato et al. |
| 2002/0048656 | A1 | 4/2002 | Sato et al. |
| 2002/0192434 | A1 | 12/2002 | Yuan et al. |
| 2003/0008112 | A1 | 1/2003 | Cole et al. |
| 2003/0021962 | A1 | 1/2003 | Mukherjee et al. |
| 2004/0002570 | A1 | 1/2004 | Parrinello et al. |
| 2004/0100546 | A1 | 5/2004 | Horvarth |
| 2004/0146700 | A1 | 7/2004 | Boyd et al. |
| 2005/0048230 | A1 | 3/2005 | Dalvey et al. |
| 2007/0172609 | A1 | 7/2007 | Williams |
| 2007/0172610 | A1 | 7/2007 | Williams |
| 2007/0221317 | A1 | 9/2007 | Kronzer et al. |
| 2007/0231509 | A1 | 10/2007 | Xu et al. |
| 2008/0149263 | A1 | 6/2008 | Dalvey et al. |
| 2008/0302473 | A1 | 12/2008 | Dalvey et al. |
| 2008/0305253 | A1 | 12/2008 | Dalvey et al. |
| 2011/0111146 | A1 | 5/2011 | Williams |

FOREIGN PATENT DOCUMENTS

| | | | |
|---|---|---|---|
| EP | 0466503 | A1 | 1/1992 |
| EP | 0728801 | A2 | 8/1996 |
| EP | 0782931 | A1 | 7/1997 |
| EP | 0820874 | A1 | 1/1998 |
| EP | 0842787 | A1 | 5/1998 |
| EP | 0878320 | A1 | 11/1998 |
| EP | 0881092 | A2 | 12/1998 |
| EP | 0896883 | A1 | 2/1999 |
| EP | 0899121 | A1 | 3/1999 |
| EP | 0933225 | A1 | 8/1999 |
| EP | 1243434 | A1 | 9/2002 |
| FR | 2442721 | | 6/1980 |
| FR | 2690873 | | 11/1993 |
| GB | 2202641 | A | 9/1988 |
| GB | 2295973 | A | 6/1996 |
| JP | 63122592 | | 5/1988 |
| JP | 1037233 | A | 2/1989 |
| JP | 7276833 | A | 10/1995 |
| JP | 8085269 | A | 4/1996 |
| WO | WO-9321561 | A1 | 10/1993 |
| WO | WO-9718090 | A1 | 5/1997 |
| WO | WO-9820393 | A1 | 5/1998 |
| WO | WO-9821398 | A1 | 5/1998 |
| WO | WO-0073570 | A1 | 12/2000 |
| WO | WO-2005077663 | A1 | 8/2005 |

OTHER PUBLICATIONS

U.S. Appl. No. 13/005,849, filed Jan. 13, 2011, Image Transfer Material and Polymer Composition.

"U.S. Appl. No. 10/589,022, Non Final Office Action mailed Jul. 13, 2010", 5 pgs.

"U.S. Appl. No. 10/589,022, Response filed Apr. 20, 2010 to Restriction Requirement mailed Oct. 20, 2009", 2 pgs.

"U.S. Appl. No. 10/589,022, Restriction Requirement mailed Oct. 20, 2009", 6 pgs.

"U.S. Appl. No. 13/005,849 , Response filed May 9, 2012 to Non Final Office Action mailed Feb. 27, 2012", 10 pgs.

"U.S. Appl. No. 13/005,849, Final Office Action mailed Jun. 7, 2012", 4 pgs.

"U.S. Appl. No. 13/005,849, Non Final Office Action mailed Feb. 27, 2012", 5 pgs.

"U.S. Appl. No. 13/005,849, Notice of Allowance mailed Jun. 26, 2012", 9 pgs.

Boku, Ikuta, et al., "Patent Abstracts of Japan", vol. 2000, No. 22, Mar. 9, 2001& JP 2001 130130 A (Diashowa Paper Mfg Co Ltd) May 15, 2001 abstract, paragraph 0006, 0008 and 0011 examples, (May 15, 2001), 1 pg.

Hiroyoshi, Hosomura, et al., "Patent Abstracts of Japan", vol. 005, No. 005 (P-044) Jan. 14, 1981 & JP 55135853 A (Fuji Xerox Co. Ltd) Oct. 23, 1980 abstract, (Oct. 1980), 1 pg.

Toshikazu, Fukui, "English Abstract of JP2147291", (Jun. 6, 1990), 1 pg.

Toshio, Yamagata, et al., "English Abstract of JP 8324106", (Dec. 1996), 1 pg.

Yoshihiro, Okamoto, et al., "Patent Abstracts of Japan", vol. 009, No. 078 (C-274), Apr. 6, 1985 & JP 59210978 A (Dainippon INk Kagaku Kogyo KK), Nov. 29, 1984 abstract, 1 pg.

Yoshinori, Watanabe, et al., "Patent Abstracts of Japan", vol. 009, No. 01 Jan. 30, 1998 & JP 09248974 A (OJI Paper Co Ltd) Sep. 22, 1997 abstract, 1 pg.

ions Ser. No. 13/005,849, filed on Jan. 13, 2011, now patented as U.S. Pat. No. 8,334,030, which is a divisional of U.S. patent application Ser. No. 10/589,022, filed on Aug. 10, 2006, now abandoned, which is a nationalization under 35 U.S.C. 371 and claims the benefit of priority under 35 U.S.C. §120 to International Patent Application No. PCT/US2005/00386, filed on Feb. 9, 2005, and published on Aug. 25, 2005 as WO 2005/077663 A1, which claims priority under 35 U.S.C. §119(e) to U.S. Provisional Application Ser. No. 60/542,886, filed on Feb. 10, 2004, and to U.S. Provisional Application Ser. No. 60/616,650, filed on Oct. 8, 2004, all of which are incorporated herein in their entireties by this reference.

IMAGE TRANSFER MATERIAL AND POLYMER COMPOSITION

This application is a continuation of U.S. patent application Ser. No. 13/005,849, filed on Jan. 13, 2011, now patented as U.S. Pat. No. 8,334,030, which is a divisional of U.S. patent application Ser. No. 10/589,022, filed on Aug. 10, 2006, now abandoned, which is a nationalization under 35 U.S.C. 371 and claims the benefit of priority under 35 U.S.C. §120 to International Patent Application No. PCT/US2005/00386, filed on Feb. 9, 2005, and published on Aug. 25, 2005 as WO 2005/077663 A1, which claims priority under 35 U.S.C. §119(e) to U.S. Provisional Application Ser. No. 60/542,886, filed on Feb. 10, 2004, and to U.S. Provisional Application Ser. No. 60/616,650, filed on Oct. 8, 2004, all of which are incorporated herein in their entireties by this reference.

BACKGROUND OF THE INVENTION

1. Field of the Invention

The present invention relates to an image transfer material, comprising a support, optionally at least one barrier layer, a melt transfer layer, and an image receiving layer. The top surface of the image receiving layer is receptive to images, for instance, ink jet images, photocopy images, etc. Optionally, one or more opaque layers may be coated between the melt transfer layer and the image receiving layer. The optional opaque layer(s) adds a rigid or stiff quality to the transfer material for ease of handling, as well as having opacity, especially white, to enhance visibility of the image when placed thereon. When optional opaque layers are placed between the melt transfer layer and the image receiving layer, the support and barrier layers are both optional since the combination of melt transfer layer, opaque layer(s) and image receiving layer may function independently as an image transfer sheet, which may be optionally imaged prior to transfer to a receptor element. For instance, a material comprising the melt transfer layer, one or more opaque layers and an image receiving layer may be optionally imaged, placed melt transfer layer down on a receptor element, optionally imaged and then adhered using a heat source.

The present invention further relates to a process for preparing the above image transfer material. According to the present invention, optionally at least one barrier layer is coated on the support, and the melt transfer layer is coated onto the optionally barrier-coated support. Possible ways of applying the melt transfer layer include extrusion and lamination. Next, the image receiving layer is coated onto the melt transfer layer.

The present invention further relates to a heat transfer process using the same material. For instance, after imaging, the image receiving layer and melt transfer layer are peeled away from the support material and placed, preferably image side up, on top of a receptor element, such as cotton or cotton/polyester blend fabrics or the like. A non-stick sheet is then optionally placed over the imaged peeled material and heat, for instance, from a source such as a hand iron, is applied to the top of the optional non-stick sheet. If a heat source such as an oven is used, a non-stick sheet is unnecessary. A non-stick sheet is also not necessary if the material does not stick to the heat source, such as a stick-free hand iron or heat press. The melt transfer layer then melts and adheres the image to the receptor element. After heat application, the non-stick sheet is removed and the image remains attached to the receptor element.

2. Description of the Prior Art

Textiles such as shirts (e.g., tee shirts) having a variety of designs thereon have become very popular in recent years. Many shirts are sold with pre-printed designs to suit the tastes of consumers. In addition, many customized tee shirt stores are now in the business of permitting customers to select designs or decals of their choice. Processes have also been proposed which permit customers to create their own designs on transfer sheets for application to tee shirts by use of a conventional hand iron, such as described in U.S. Pat. No. 4,244,358. Furthermore, U.S. Pat. No. 4,773,953, is directed to a method for utilizing a personal computer, a video camera or the like to create graphics, images, or creative designs on a fabric. These designs may then be transferred to the fabric by way of an ink jet printer, a laser printer, or the like.

Other types of heat transfer sheets are known in the art. For example, U.S. Pat. No. 5,798,179 is directed to a printable heat transfer material using a thermoplastic polymer such as a hard acrylic polymer or poly(vinyl acetate) as a barrier layer, and has a separate film-forming binder layer. U.S. Pat. No. 5,271,990 relates to an image-receptive heat transfer paper which includes an image-receptive melt-transfer film layer comprising a thermoplastic polymer overlaying the top surface of a base sheet. U.S. Pat. No. 5,502,902 relates to a printable material comprising a thermoplastic polymer and a film-forming binder. U.S. Pat. No. 5,614,345 relates to a paper for thermal image transfer to flat porous surfaces, which contains an ethylene copolymer or a ethylene copolymer mixture and a dye-receiving layer.

Other examples of heat transfer materials are disclosed by, for example, U.S. Pat. No. 6,410,200 which relates to a polymeric composition comprising an acrylic dispersion, an elastomeric emulsion, a plasticizer, and a water repellant. U.S. Pat. No. 6,358,660 relates to a barrier layer. The barrier layer of U.S. Pat. No. 6,358,660 provides for "cold peel," "warm peel" and "hot peel" applications and comprises thermosetting and/or ultraviolet (UV) curable polymers. U.S. application Ser. No. 09/980,589, filed Dec. 4, 2001, relates to a transferable material having a transfer blocking overcoat and to a process using said heat transferable material having a transfer blocking overcoat.

Some of the above-mentioned applications contain specific systems for forming clear images which are subsequently transferred onto the receptor element. However, other heat transfer systems exist, for example, those disclosed by U.S. Pat. Nos. 4,021,591, 4,555,436, 4,657,557, 4,914,079, 4,927,709, 4,935,300, 5,322,833, 5,413,841, 5,679,461, 5,741,387, and 6,432,514.

Problems with many known transfer sheets is the expense involved in coating numerous solutions onto a support material and the overall feel of the imaged product. However, the present invention represents a revolution in the image transfer industry. It is very inexpensive, has a very soft feel to the touch, and can be washed in the washing machine with detergent. No special washing or drying procedures are required in order to preserve the transferred image. Additionally, it includes the advantages of a "peel-away" imaging material. With a peel-away material, the image that is placed on the imaging material is transferred directly to the receptor element without need of an inverted or reversed image, such as disclosed in U.S. Pat. No. 6,383,710 B2. Traditional transfer materials required images to be added to the material in an inverted or reversed orientation so that the image, when placed face down on the receptor element, would appear in the correct orientation in the final product.

SUMMARY OF THE INVENTION

In order to attract the interest of consumer groups that are already captivated by the tee shirt rage described above, the present invention provides, in one embodiment, an improved transfer sheet. In another embodiment, the present invention provides for a process for preparing the transfer sheet. In another embodiment, the present invention provides for a heat transfer of images to a receptor element.

The present invention relates to an image transfer material, comprising a support, an optional barrier layer, a melt transfer layer, and an image receiving layer. Optionally, one or more opaque layers may be coated between the melt transfer layer and the image receiving layer.

Further, when one or more opaque layer is placed between the melt transfer layer and the image receiving layer, both the support and the barrier layer are optional since the combination of melt transfer layer, opaque layer(s) and image receiving layer may function as an image transfer sheet, which may be optionally imaged prior to transfer to a receptor element. For instance, a material comprising the melt transfer layer, one or more opaque layers and an image receiving layer may be optionally imaged, placed melt transfer layer down on a receptor element, optionally imaged and then adhered using a heat source. The present invention further relates to a process for preparing the above image transfer material. According to the present invention, the optional barrier layer is coated on the support, the transfer layer is applied onto the optionally barrier-coated support, and the image receiving layer is coated onto the laminated transfer layer. Ways of applying the melt transfer layer include extrusion and lamination.

The embodiment using one or more opaque layers between a melt transfer layer and an image receiving layer may be prepared by coating the melt transfer layer on one side of the opaque layer(s) and the image receiving layer on the other. Alternatively, an optional barrier layer is coated on a support, the melt transfer layer is applied onto the optionally barrier-coated support, the one or more opaque layers is/are applied over the melt transfer layer and then and the image receiving layer is coated onto the melt transfer layer. Then, the support is peeled away from the upper layers leaving the melt transfer layer, upon which is the one or more opaque layers, upon which is the image receiving layer.

The present invention further relates to a heat transfer process using the present image transfer material. First, the top surface of the image receiving layer is optionally imaged using any imaging technique. Next, the optionally imaged, image receiving layer and melt transfer layer are peeled away from the support. Then the optionally imaged peeled material is placed, preferably imaged side up (when imaged), on top of a receptor element and further optionally imaged. Alternatively, the image receiving layer and melt transfer layer are first peeled away from the support, then optionally imaged, and then placed, preferably imaged side up (when imaged) on top of the receptor element and further optionally imaged. Alternatively, when one or more opaque layers are present, the melt transfer layer, with one or more opaque layer(s) and image receiving layer are first either peeled from the support and optionally imaged or optionally imaged and then peeled from the support. Next, heat is applied (e.g., by way of a hand iron, a heat press or an oven), to the top of the optional image. If a hand iron or a heat press is used, a tack-free sheet should be placed between the iron or press and the imaged material, unless the heating device is itself tack-free. Upon heating, the melt transfer layer melts and adheres the optionally imaged image receiving layer to the receptor element. After heat application, the non-stick sheet is removed and the image remains attached to the receptor element.

BRIEF DESCRIPTION OF THE DRAWINGS

The present invention will become more fully understood from the detailed description given hereinbelow, and the accompanying drawings that are given by way of illustration only and thus are not limitive of the present invention, and wherein:

FIG. 2 illustrates the step of ironing the transfer element of the present invention onto a tee shirt or the like.

DETAILED DESCRIPTION OF THE INVENTION

Figure 1:
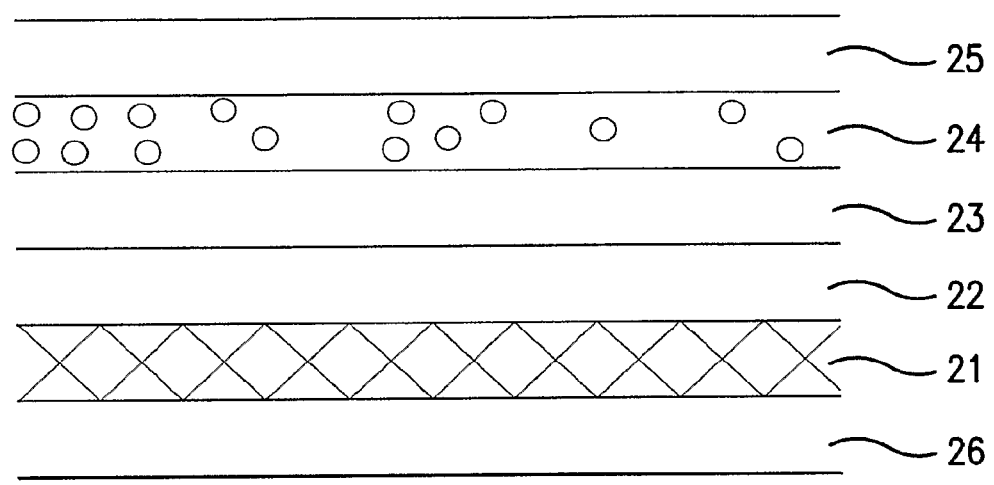
FIG. 1 is a cross-sectional view of one embodiment of the transfer element of the present invention.

In one embodiment, the present invention relates to an image transfer material, comprising a support, an optional barrier layer, a melt transfer layer, and an image receiving layer. Optionally, one or more opaque layers may be coated between the melt transfer layer and the image receiving layer. When optional opaque layers are placed between the melt transfer layer and the image receiving layer, the support and barrier layers are both optional.

In another embodiment, the present invention relates to a process for preparing the above image transfer material. According to the present invention, the optional barrier layer is coated on the support, the melt transfer layer is coated onto the optionally barrier-coated support, and the image receiving layer is coated onto the laminated transfer layer. The melt transfer layer may be coated by extrusion or lamination onto the optionally barrier-coated support.

In yet another embodiment, the present invention further relates to a heat transfer process using the present image transfer material. First, the top surface of the image receiving layer is optionally imaged using any conventional imaging technique including but not limited to, ink jet printers, bubblejet printers, thermal inkjet methods, piezo inkjet methods, laser printers, crayons, and the like. Next, the optionally imaged, image receiving layer and melt transfer layer are peeled away from the support (e.g., peeled in the absence of water or other chemical aid). Then the optionally imaged peeled material is placed, preferably imaged side up (when imaged), on top of a receptor element and optionally imaged. Alternatively, the image receiving layer and melt transfer layer are first peeled away from the support, then optionally imaged, and then placed, preferably imaged side up (when imaged) on top of the receptor element and optionally imaged. Next, heat is applied (e.g., by way of a hand iron, a heat press or an oven), to the top of the optional image. If a hand iron or a heat press is used, a tack-free sheet should be placed between the iron or press and the imaged material, unless the heating device is itself tack-free. Upon heating, the melt transfer layer melts and adheres the optionally imaged image receiving layer to the receptor element. After heat application, the non-stick sheet is removed and the image remains attached to the receptor element.

The present invention also provides for a kit containing the transfer sheet of the present invention and instructions for transferring an image thereon. The kit may also optionally contain a tack-free sheet, markers, paint, crayons, tee-shirts, prep-shirts or other design aids.

A. The Transfer Material

1. Support Layer

The support is a thin flexible, but non-elastic carrier sheet. The support is not particularly limited and may be any conventional support sheet which is suitably flexible. Typically, the support sheet is a paper web, plastic film, metal foil, wood pulp fiber paper, vegetable parchment paper, lithographic printing paper or similar material.

In one embodiment of the present invention an appropriate support material may include but is not limited to a cellulosic nonwoven web or film, such as a smooth surface, heavyweight (approximately 24 lb.) laser printer or color copier paper stock or laser printer transparency (polyester) film. However, highly porous supports are less preferred because they tend to absorb large amounts of any material coated thereon. The particular support used is not known to be critical, so long as the support has sufficient strength for handling, copying, coating, heat transfer, and other operations associated with the present invention. Accordingly, in accordance with some embodiments of the present invention, the support may be the base material for any printable material, such as described in U.S. Pat. No. 5,271,990. In a preferred embodiment, the support layer is 70-100 GSM paper.

2. Optional Barrier Layer

The support contains an optional barrier coating on one or both support surfaces. Any suitable barrier layer may be used. For instance, barrier layers may include, but are not limited to, the barrier layers disclosed in U.S. Pat. Nos. 6,410,200, 6,358,660, 5,501,902, 5,271,990, and 5,242,739, which are herein incorporated by reference.

Other suitable barrier layers include those disclosed in U.S. Pat. Nos. 4,021,591, 4,555,436, 4,657,557, 4,914,079, 4,927,709, 4,935,300, 5,322,833, 5,413,841, 5,679,461, 5,741,387, 5,798,179, and 5,603,966, all of which are herein incorporated by reference.

Lastly, suitable barrier layers include the barrier layers of U.S. Pat. Nos. 4,773,953, 4,980,224, 5,620,548, 5,139,917, 5,236,801, 5,883,790, 6,245,710, 6,083,656, 5,948,586, 6,265,128, 6,033,824, 6,294,307, 6,410,200 and 6,358,660, and U.S. application Ser. Nos. 09/366,300, 09/547,760, 09/637,082, 09/828,134, 09/980,589, 09/453,881, 09/791,755, 10/089,446, and 10/205,628, and Provisional U.S. Application Ser. Nos. 60/396,632 and 60/304,752.

Coating weights for the barrier layer may range from one (1) gram per meter square to 20 grams per meter square, preferably from 1 g/m.sup.2 to 15 g/m.sup.2, most preferably 1 g/m.sup.2 to 8 g/m.sup.2.

In one embodiment of the present invention, the barrier layer comprises silicon or silicone containing compound.

3. The Melt Transfer Layer

The melt transfer layer is applied on top of the optionally barrier-coated support. Any melt transfer layer may be used, for instance, any of the melt transfer layers disclosed in U.S. Pat. Nos. 6,410,200, 6,358,660, 5,501,902, 5,271,990, 5,242,739, 4,021,591, 4,555,436, 4,657,557, 4,914,079, 4,927,709, 4,935,300, 5,322,833, 5,413,841, 5,679,461, 5,741,387, 5,798,179, 5,603,966, 4,773,953, 4,980,224, 5,620,548, 5,139,917, 5,236,801, 5,883,790, 6,245,710, 6,083,656, 5,948,586, 6,265,128, 6,033,824, 6,294,307, 6,410,200 and 6,358,660, and U.S. application Ser. Nos. 09/366,300, 09/547,760, 09/637,082, 09/828,134, 09/980,589, 09/453,881, 09/791,755, 10/089,446, and 10/205,628, and Provisional U.S. Application Ser. Nos. 60/396,632 and 60/304,752, all of which are herein incorporated by reference.

Preferably, the melt transfer layer has a slight tack which keeps the image receiving layer on the optionally barrier-coated support during handling. That is, the melt transfer layer preferably has sufficient tack to hold it onto the optionally barrier-coated support. However, the tack must not be so strong as to permanently bond the melt transfer layer to the support. The preferred tack would be similar to that found with an adhesive class of polymer coatings known as the removable pressure sensitive adhesives (e.g., 3M "Post-It"). A removable pressure sensitive adhesive is characterized as an adhesive that allows two surfaces to be separated, reversibly, without damage to either surface.

After printing/copying/drawing, the image receiving layer is peeled away from the support material. During the peeling process, the melt transfer layer comes away with the image receiving layer and will serve as the source of adhesion during the transfer upon the application of heat.

The melt transfer layer is coated onto the top of the barrier layer. The thickness ranges from 1 to 5 mils, preferably 1 to 2 mils, most preferably about 1.5 mils. The melt transfer layer has a dry coat of about 2 to 40 g/m.sup.2 and a thickness of 0.05 to 1.6 mil. A preferred dry coat weight would be 10-30 g/m.sup.2; and, the most preferred coat weight would be 15-25 g/m.sup.2.

In a preferred embodiment, the melt transfer layer is a polyurethane layer having sufficient thickness that upon melting adheres to the receptor element. Preferred thickness for the polyurethane layer range from about 1.25 mils to 1.5 mils.

Any polyester, acrylic polymer, polyolefin, polyurethane or copolymer blends may be used that exhibits a melt transition temperature in the range 50° C.-250° C., or when the glass transition temperature (Tg) of the polyolefin, polyester, polyurethane, acrylic polymer or copolymer blend is less than about 25 degrees Centigrade. Preferably, the Tg will fall between about 25° C. and 120° C. and display a slight tack when touched. Non-limiting examples include polyamide (4220; Bemis Associates), polyurethane (5250; Bemis Associates; Estane™ 5700 series, in particular Estane™ 5703 TPU of Noveon, Inc. Cleveland Ohio; or Daotan polyurethanes by Surface Specialties, Inc. UBC), polyester (UAF-425 or PAF-110; Adhesive Films, Inc.), and polyester (Integral Film 801; Dow Co.)

In one embodiment, the melt transfer layer comprises an ethylene vinyl acetate/ethylene acrylic acid copolymer blend. In another embodiment, the melt transfer layer comprises a EVA based terpolymer of ethylene-vinyl acetate and maleic anhydride terpolymer. In another embodiment, the melt transfer layer comprises polyurethane. Aspects of the polyurethane that are important include the softening temperature, softness of the polymer, color of the polymer and elasticity of the polymer. It is desirable to use a polyurethane that is as soft as possible, but has high elastic properties. Polyurethane products having a Shore Hardness between 70 A and 90 A are preferred. Non-yellowing of the melt transfer layer is important and therefore the polyurethane should be non-yellowing. Aliphatic polyurethanes are more UV stable than other polyurethanes such as aromatic polyurethanes and therefore can possess better non-yellowing properties.

In one embodiment of the invention, the melt transfer layer comprises an ethylene acrylic acid co-polymer dispersion, an elastomeric emulsion, a polyurethane dispersion, and polyethylene glycol. An example of this embodiment is Melt Transfer Layer Formulation 1.

The acrylic dispersion is present in a sufficient amount so as to provide adhesion of the melt transfer layer and image to the receptor element upon application of heat and is preferably present in an amount of from 46 to 90 weight %, more preferably 70 to 90 weight % based on the total composition of the melt transfer layer.

The elastomeric emulsion provides the elastomeric properties such as mechanical stability, flexibility and stretchability, and is preferably present in an amount of from 1 to 45 weight %, more preferably 1 to 20 weight % based on the total composition of the melt transfer layer.

The water repellent provides water resistance and repellency, which enhances the wear resistance and washability of the image on the receptor, and is preferably present in an amount of from 1 to 7 weight %, more preferably 3 to 6 weight % based on the total composition of the melt transfer layer.

The plasticizer provides plasticity and antistatic properties to the transferred image, and is preferably present in an amount of from 1 to 8 weight %, more preferably 2 to 7 weight % based on the total composition of the melt transfer layer.

The acrylic dispersion may be an ethylene acrylic acid co-polymer dispersion that is a film-forming binder that provides the "release" or "separation" from the support. The melt transfer layer of the invention may utilize the film-forming binders of the image-receptive melt-transfer film layer of U.S. Pat. No. 5,242,739, which is herein incorporated by reference.

Thus, the nature of the film-forming binder is not known to be critical. That is, any film-forming binder can be employed so long as it meets the criteria specified herein. As a practical matter, water-dispersible ethylene-acrylic acid copolymers have been found to be especially effective film forming binders.

The term "melts" and variations thereof are used herein only in a qualitative sense and are not meant to refer to any particular test procedure. Reference herein to a melting temperature or range is meant only to indicate an approximate temperature or range at which a polymer or binder melts and flows under the conditions of a melt-transfer process to result in a substantially smooth film.

Manufacturers' published data regarding the melt behavior of polymers or binders correlate with the melting requirements described herein. It should be noted, however, that either a true melting point or a softening point may be given, depending on the nature of the material. For example, materials such as polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior. Moreover, the melting points or softening points described are better indicators of performance than the chemical nature of the polymer or binder.

In another embodiment of the invention, the polymer may be applied to optionally barrier-coated support in powder form, and then, heat is applied to form a coherent mass of the polymer on the support. This process is often referred to in the textile industry as powder sintering. Any polyethylene, polyamide or blends thereof may be used in the process. Vestamelt 350, 432, 730, 732 and 750 (Degussa Corp.) are examples of a polyolefin polyamide blends with a typical melt transition temperature in the range of 105-130° C. Polyethylene powders are typically low density polyethylene (LDPE) compositions with a melt temperature in the range 50-250° C., preferably 70-190° C. and most preferably 80-150° C. LDPE examples include Microthene F501 (Equistar Chemical Co.) with a melt temperature of 104° C., and Icotex 520-5016 (Icopolymers Co.) with a melt temperature of 100° C.

Representative melt transfer binders (e.g., acrylic dispersions) for release from the support are as follows:

Melt Transfer Binder A

Binder A is Michem® 58035, supplied by Michelman, Inc., Cincinnati, Ohio. This is a 35 percent solids dispersion of Allied Chemical's AC 580, which is approximately 10 percent acrylic acid and 90 percent ethylene. The polymer reportedly has a softening point of 102° C. and a Brookfield viscosity of 0.65 pas (650 centipoise) at 140° C.

Melt Transfer Binder B

This binder is Michem® Prime 4983R (Michelman, Inc., Cincinnati, Ohio). The binder is a 25 percent solids dispersion of Primacor® 5983 made by Dow Chemical Company. The polymer contains 20 percent acrylic acid and 80 percent ethylene. The copolymer has a Vicat softening point of 43° C. and a ring and ball softening point of 100° C. The melt index of the copolymer is 500 g/10 minutes (determined in accordance with ASTM D-1238).

Melt Transfer Binder C

Binder C is Michem® 4990 (Michelman, Inc., Cincinnati, Ohio). The material is 35 percent solids dispersion of Primacor® 5990 made by Dow Chemical Company. Primacor® 5990 is a copolymer of 20 percent acrylic acid and 80 percent ethylene. It is similar to Primacor® 5983 (see Binder B), except that the ring and ball softening point is 93° C. The copolymer has a melt index of 1,300 g/10 minutes and Vicat softening point of 390C.

Melt Transfer Binder D

This binder is Michem® 37140, a 40 percent solids dispersion of a Hoechst-Celanese high density polyethylene. The polymer is reported to have a melting point of 100° C.

Melt Transfer Binder E

This binder is Michem® 32535 which is an emulsion of Allied Chemical Company's AC-325, a high density polyethylene. The melting point of the polymer is about 138° C. Michem® 32535 is supplied by Michelman, Inc., Cincinnati, Ohio.

Melt Transfer Binder F

Binder F is Michem® 48040, an emulsion of an Eastman Chemical Company microcrystalline wax having a melting point of 88° C. The supplier is Michelman, Inc., Cincinnati, Ohio.

Melt Transfer Binder G

Binder G is Michem® 73635M, an emulsion of an oxidized ethylene-based polymer. The melting point of the polymer is about 96° C. The hardness is about 4-6 Shore-D. The material is supplied by Michelman Inc., Cincinnati, Ohio.

The second component of Melt Transfer Layer Formulation 1 is an elastomeric emulsion, preferably a latex, and is compatible with the other components, and formulated to provide durability, mechanical stability, and a degree of softness and conformability to the layers.

Films of this material must have moisture resistance, low tack, durability, flexibility and softness, but with relative toughness and tensile strength. Further, the material should preferably have inherent heat and light stability. The latex can be heat sensitized, and the elastomer can be self-crosslinking or used with compatible cross-linking agents, or both. The latex should be sprayable, or roll stable for continuous runnability on nip rollers.

Elastomeric latexes of the preferred type are produced from the materials and processes set forth in U.S. Pat. Nos. 4,956,434 and 5,143,971, which are herein incorporated by reference. This curable latex is derived from a major amount of acrylate monomers such as $C_4$ to $C_8$ alkyl acrylate, preferably n-butyl acrylate, up to about 20 parts per hundred of total monomers of a monolefinically unsaturated dicarboxylic acid, most preferably itaconic acid, a small amount of crosslinking agent, preferably N-methyl acrylamide, and optionally another monolefinic monomer.

Using a modified semibatch process in which preferably the itaconic acid is fully charged initially to the reactor with the remaining monomers added over time, a latex of unique polymer architecture or morphology is created, leading to the unique rubbery properties of the cured films produced therefrom.

The third ingredient of Melt Transfer Layer Formulation 1 is a water resistant and adhesion aid such as a polyurethane dispersion. Preferably, the polyurethane will be a self-crosslinking formulation incorporating crosslinking agents such as melamine. This ingredient is also a softener for the acrylic dispersion and plasticizer aid.

Such polyurethane product may be produced by polymerizing one or more acrylate and other ethylenic monomers in the presence of an oligourethane to prepare oligourethane acrylate copolymers. The oligourethane is preferably prepared from diols and diisocyanates, the aliphatic or alicyclic based diisocyanates being preferred, with lesser amounts, if any, of aromatic diisocyanates, to avoid components which contribute to yellowing. Polymerizable monomers, in addition to the usual acrylate and methacrylate esters of aliphatic monoalcohols and styrene, further include monomers with carboxyl groups, such as acrylic acid or methacrylic acid, and those with other hydrophylic groups such as the hydroxyalkyl acrylates (hydroxyethyl methacrylate being exemplary). The hydrophylic groups in these monomers render the copolymer product dispersible in water with the aid of a neutralizing agent for the carboxyl groups, such as dimethylethanolamine, used in amount to at least partially neutralize the carboxyl groups after dispersion in water and vacuum distillation to remove any solvents used to prepare the urethane acrylic hybrid. Further formulations may include the addition of crosslinking components such as amino resins, strained amines or blocked polyisocyanates. Although pigments and fillers could be added to any of the coating layers, such use to uniformly tint or color the web could be used for special effect, but would not be used where an image is desired in the absence of background coloration. Urethane acrylic hybrid polymers are further described in U.S. Pat. No. 5,708,072, and their description in this application is incorporated by reference.

Self crosslinking acrylic polyurethane hybrid compositions can also be prepared by the processes and materials of U.S. Pat. No. 5,691,425, herein incorporated by reference. These are prepared by producing polyurethane macromonomers containing acid groups and lateral vinyl groups, optionally terminal vinyl groups, and hydroxyl, urethane, thiourethane and/or urea groups. Polymerization of these macromonomers produces acrylic polyurethane hybrids which can be dispersed in water and combined with crosslinking agents for solvent-free coating compositions.

Autocrosslinkable polyurethane-vinyl polymers are discussed in detail in U.S. Pat. No. 5,623,016 and U.S. Pat. No. 5,571,861, and their disclosure of these materials is incorporated by reference. The products usually are polyurethane-acrylic hybrids, but with self-crosslinking functions. These may be carboxylic acid containing, neutralized with, e.g. tertiary amines such as ethanolamine, and form useful adhesions and coatings from aqueous dispersion.

The elastomeric emulsion and polyurethane dispersion are, generally, thermoplastic elastomers. Thermoplastic elastomeric polymers are polymer blends and alloys which have both the properties of thermoplastic polymers, such as having melt flow and flow characteristics, and elastomers, which are typically polymers which cannot melt and flow due to covalent chemical crosslinking (vulcanization) or regions (blocks) of highly ordered polymeric units. Thermoplastic elastomers are generally synthesized using two or more monomers that are incompatible; for example, styrene and butadiene. By building long runs of polybutadiene with intermittent polystyrene runs, microdomains are established which imparts the elastomeric quality to the polymer system. However, since the microdomains are established through physical crosslinking mechanisms, they can be broken by application of added energy, such as heat from a hand iron, and caused to melt and flow; and therefore, are elastomers with thermoplastic quality.

Thermoplastic elastomers have been incorporated into the present invention in order to provide the image system with elastomeric quality. Two thermoplastic elastomer systems have been introduced; that is, a polyacrylate terpolymer elastomer (for example, Hystretch V-29) and an aliphatic urethane acryl hybrid (for example, Daotan VTW 1265). Thermoplastic elastomers can be chosen from a group that includes, for example, ether-ester, olefinic, polyether, polyester and styrenic thermoplastic polymer systems. Specific examples include, by way of illustration, thermoplastic elastomers such as polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride). Generally, thermoplastic elastomers can be selected from a group having a glass transition temperature (Tg) ranging from about $-50°$ C. to about $25°$ C.

Although polyurethane is one component of one of the embodiments of the present melt transfer layer, the melt transfer layer may comprises polyurethane as the main or single component. For instance, reference is made to Melt Transfer Layer Formulations 3 and 4. The melt transfer layer as a polyurethane layer preferably has sufficient thickness that upon melting adheres to the receptor element. Preferred thickness for the polyurethane layer range from about 1.25 mils to 1.5 mils.

The fourth component of Melt Transfer Layer Formulation 1 is a plasticizer such as a polyethylene glycol dispersion which provides mechanical stability, water repellency, and allows for a uniform, crack-free film. Accordingly, a reason to add the polyethylene glycol dispersion is an aid in the coating process. Further, the polyethylene glycol dispersion acts as a softening agent. A preferred fourth component is Carbowax Polyethylene Glycol 400, available from Union Carbide.

An optional fifth ingredient of Melt Transfer Layer Formulation 1 is a surfactant and wetting agent such as polyethylene glycol mono ((tetramethylbutyl) phenol) ether. Alternatively, the representative binders, described above that are suitable for Melt Transfer Layer Formulation 1, may be used in lieu of the above-described ethylene acrylic acid copolymer dispersion.

In a one embodiment, the melt transfer layer is composed of a crosslinking polymer, for example, polyurethane or polyethylene. When heat is applied to the melt transfer layer, it bonds to the receptor element. The bond created is durable to washing, dry-cleaning, and is durable under mechanical stress.

5. Optional Opaque Layer(s)

The present material may optionally contain one or more opaque layers, for instance the opaque layers described in pending U.S. patent application Ser. Nos. 10/089,446 and 10/483,387. In the present invention, the optional opaque layer(s) is placed between the melt transfer layer and the image receiving layer.

The optional opaque layer(s) adds a rigid or stiff quality to the transfer sheet for ease of handling, as well as having opacity, especially white, to enhance visibility of the image when placed thereon. That is, the opaque layer(s) aid in ink visibility on various colored receptors.

Note that, if desired, when one or more opaque layers is used between the melt transfer layer and the image receiving layer, the use of the support and barrier layer become optional. The support and barrier layer may be used to facilitate the preparation of an image transfer material having a melt transfer layer, one or more opaque layers and an image receiving layer, however, the product itself need only contain one or more opaque layers with a melt transfer layer on one side and an image receiving layer on the other. The one or more opaque layers provide the necessary rigidity that would normally be supplied by the support.

The thickness of the one or more opaque layers, when no support layer is present, should be sufficient to provide necessary thickness and rigidity for the intended use or mode of imaging of the transfer paper. Depending upon the intended use, the thickness and rigidity will vary. For example, if intended to be imaged with a printer, e.g., an ink jet printer, the combination of the melt transfer layer, one or more opaque layer and image receiving layer preferably have sufficient rigidity to as to pass through the printer without substantial damage. Exemplary thickness of an opaque layer in such an instance range from about 0.5 mils to about 2.5 mils.

5.1 Opaque Layer A

When one or more opaque layers are employed, the opaque layer provides additional background contrast for the applied image to render it visible against, for instance a dark or a light receptor. The opaque layer(s) improves the appearance and readability of an image, such as, for instance, a bar code or a color image.

When permanently adhering the image material to a textile, the opaque layer(s) layers preferably will be thermoplastic and optionally thermosetting as they are applied to a porous substrate such as a fabric. When a thermosettable formulation is employed for the opaque layers, the image fused into the fabric will have the maximum resistance to washing or dry cleaning.

The first optional opaque layer (Opaque layer A) adds a rigid or stiff quality to the entire heat-setting label sheet for ease of handling, as well as having a white (or colored) opacity. Any pigmented resin may be used to achieve the desired outcome.

A preferred embodiment of opaque layer A, Opaque Layer formulation 1 comprises styrene-butadiene latex, thermoplastic elastomer, an elastomer and an optional pigment.

All the above chemicals form a homogeneous dispersion aided by a stir bar at a low to medium stir rate. All mixing can be done at room temperature. After coating, the preferred thickness of Opaque Layer A is about 1.5 mils (wet).

In the above-described preferred embodiment, a pigment such as a white pigment may be used to exhibit opacity capabilities. Also in the preferred embodiment, the latex is the primary chemical imparting the rigid characteristics upon drying. The thermoplastic elastomer and acrylonic copolymer impart stretchability and flexibility in the final transferred product.

5.2 Opaque Layer B

The optional Opaque Layer B preferably contains a pigment (such as a white pigment) and provides opacity. A preferred embodiment of the optional opaque layer B. Opaque Layer Formulation 1, comprises a vinyl acetate-ethylene copolymer, thermoplastic elastomer, an elastomer and an optional pigment such as $TiO_2$.

The thermoplastic elastomer acrylonitrile copolymer impart stretchability and flexibility in the final transferred product. Practically any $TiO_2$ powder addition, present at about 25% of the total formula, will provide the desired opacity. Other powdered pigments may need to be added at varying percentages to achieve the desired opacity and color intensity.

All liquid chemicals are homogenized in the presence of a stir bar and a low speed. Upon homogenization, the pigment powder is added slowly in the presence of a high stir speed provide by a stir flea. All mixing of the above ingredients should be performed at room temperature. Preferably, optional Opaque Layer B is coated on the heat setting label sheet at a weight of about 1.0 to 1.5 mils (wet).

6. The Image Receiving Layer

An image receiving layer is applied over the melt transfer layer. The image receiving layer formulations of the present invention should be able to retain an image such as an image dye. The image receiving layer retains dyes, such as ink from ink jet printers, or dyes from a waterbased marker. If an ink jet ink is utilized, the image preferably has comparable resolution to standard ink jet paper. In one embodiment, the image receiving layer may become heat activated (e.g. melt and flow) to trap or encapsulate the dye image or ink and optionally impart waterfast characteristics.

The image receiving layer may be applied to the melt transfer layer either by a conventional saturating process such as a "dip and squeeze" process or with a coating process such as a reverse roll, meyer rod, gravure, slot die and the like.

The basis weight of the image receiving layer may vary from about 2 to about 30 $g/m^2$. Desirably, the basis weight will be from about 3 to about 20 $g/m^2$.

The image receiving layer is capable of heat sealing the image upon application of heat up to 220° C. "Heat sealing" as defined herein refers to a process whereby the polymer composition melts and flows so as to effectively encapsulate the image forming colorants therein. Heat sealing imparts waterfastness and washability. A heat sealed image would have newly imparted image permanence properties such as waterfastness and rub resistance. In one embodiment, the image receiving formulation includes a self-crosslinking polymer as a binder, for instance, Binder F below. In this embodiment, although not all components of the image receiving layer will technically melt, for instance, the self-cross linking EVA polymer will not melt, the layer will still heat seal the image.

The image receiving layer comprises binders, such as polyvinyl alcohol (PVOH), polyesters, polyurethanes, or co-polymer blends, various colorant retention aids, various optional crosslinking agents, an optional antioxidant, or an optional softening agent.

The binder imparts colorant retention and mechanical stability. A list of applicable binders include, but are not limited to, those listed in U.S. Pat. No. 5,798,179, in addition to polyolefins, polyesters, ethylene-vinyl acetate copolymers, ethylene-methacrylate acid copolymers, and ethylene-acrylic acid copolymers. The binder may also be selected from the list, mentioned herein, for use in the melt transfer layer.

Preferably, the binder is one of a self-crosslinkable acrylic copolymer, for instance, Rhoplex™ NW-1402, Rhoplex™ HA-16 or RhopleX™ HA-12 from the Rohm and Haas Corporation, or a hydrolyzed polyvinyl alcohol, for instance, Celvol™ 540 or Celvol™ 125, from the Celanese Corporation, or a self-crosslinking ethylene-vinyl acetate copolymer, for instance, Dur-o-set™ Elite Plus 25-299A, from Vinamul Polymers Corp.

The self-crosslinkable polymer binder is preferably present in an amount, based on the dry solids content of the layer, of 15-40%, and most preferably 25-35% by weight. In a preferred embodiment, the self-crosslinkable polymer binder is a thermosetting polymer such as a self-crosslinking ethylene vinyl acetate copolymer (for instance, Dur-o-set™ Elite Plus 25-299A, from Vinamul Polymers Corp.).

Representative image receiving layer binders suitable to impart color retention and mechanical stability include:

Image Receiving Layer Binder A

Image Receiving Layer Binder A is Rhoplex NW-1402, a self-crosslinkable acrylic copolymer from the Rohm and Haas Corporation. This material is a 45% solids formulation with a specific gravity of 1.0 to 1.2.

Image Receiving Layer Binder B

Image Receiving Layer Binder B is Rhoplex HA-16, a self-crosslinkable acrylic copolymer from the Rohm and Haas Corporation. This material is a 46% solids formulation with a maximum viscosity of 900 CPS.

Image Receiving Layer Binder C

Image Receiving Layer Binder C is Rhoplex HA-12, a self-crosslinkable acrylic copolymer from the Rohm and Haas Corporation. This material is a 46% solids formulation with a maximum viscosity of 750 CPS.

Image Receiving Layer Binder D

Image Receiving Layer Binder D is Celvol 540, a partially hydrolyzed polyvinyl alcohol from the Celanese Corporation.

Image Receiving Layer Binder E

Image Receiving Layer Binder E is Celvol 125, a hydrolyzed polyvinyl alcohol from the Celanese Corporation.

Image Receiving Layer Binder F

Image Receiving Layer Binder F is Dur-o-set 25-299A, a self-crosslinking EVA copolymer from Vinamul Polymers Corp. This materials is prepared as a 50% solids emulsion with a bulk density of 8.9 lb/gal.

Thermoplastic binders, other than the self-crosslinkable polymers discussed above, may also be incorporated. For instance, any of the thermoplastic binders listed above for the melt transfer layer may be incorporated. For instance, thermoplastic binders, such as those listed above may be incorporated in amounts of 5-40%, preferably 10-30% by weight based on the dry solids content.

Additionally, a polyamide copolymer, for instance, a nylon copolymer may be added to the image receiving layer. For instance nylon 6-12 (Orgasol™ 3501 EXDNAT 1, from Atofina), nylon 12 (Orgasol 2002 EXDNAT 1, from Atofina), and nylon 6 (Orgasol 1002 DNAT1, from Atofina). The formulation may also include a polyvinylpyrrolidone (PVP) polymer and copolymer blends for instance, Luvicross (BASF), Luvicross M (BASF), Luvicross VI (a PVP-vinyl imidazole copolymer blend (BASF)), and Luvitec (BASF). The polyamide copolymers may be incorporated in amounts of 5-40%, preferably 10-30% by weight based upon the dry solids of the formulation.

Silica may also be added to the image receiving layer. Silica is silicon dioxide, and can generally be any preparation that has a mean diameter not larger than 100 microns. Examples include the Syloid brand of silica (such as Syloid W-500, from Grace Davidson Co.), Sylojet brand of silica (such as the Sylojet P400, Grace Davidson Co.), INEOS silica (such as the Gasil HP270 or Gasil IJ45). Silica may be added in amounts ranging from 5-60%, preferably 10-40%, most preferably 15-35% by weight based on the dry solids content.

An antioxidant may be added to keep the binder from discoloring (yellowing) during the heat process. Suitable antioxidants include, but are not limited to, BHA; Bis(2,4-di-t-butylphenyl)pentaerythritol diphosphite; 4,4'-Butylidenebis(6-t-butyl-m-cresol), C20-40 alcohols; p-Crescol/dicyclopentadiene butylated reaction product, Di(butyl, methylpyrophosphato)ethylene titanate di(dioctyl, hydrogen phosphite); Dicyclo(dioctyl)pyrophosphato titanate; Di(dioctylphosphato)ethylene titanate; Di(dioctylpyrophosphato) ethylene titanate; Disobutylnonyl phenol; Dimethylaminomethyl phenol, Ethylhydroxymethyloleyl oxazoline Isopropyl 4-aminobenzenesulfonyl di(dodecylbenzenesulfonyl)titanate; Isopropyldimethacrylisoslearoyl titanate; Isopropyl (dioctylphosphato)titanate; isopropyltridioctylpyrophosphato) titanate; Isopropyl tri(N ethylamino-ethylamino)titanate, Lead phthalate, basic 2,2-Methylenebis (6-t-butyl-4-methylphenol), Octadecyl 3,5-di-t-butyl-4-hydroxyhydrocinnamate Phosphorus; Phosphorus trichloride, reaction prods. with 1,1'-biphenyl and 2,4-bis(1,1-dimethylethyl)phenol Tetra (2, diallyoxymethyl-1 butoxy titanium di(di-tridecyl) phosphite; Tetraisopropyl di(dioctylphosphito)titanate; Tetrakis [methylene (3,5-di-t-butyl-4-hydroxyhydrocinnamate)]methane; Tetraoctyloxytitanium; di(ditridecylphosphite); 4,4'-Thiobis-6-(t-butyl-m-cresol); Titanium di(butyl, octyl pyrophosphate)di(dioclyl, hydrogen phosphite)oxyacetate; Titanium di(cumylphenylate)oxyacetate; Titaniumdi(dioctylpyrophosphate), oxyacelate; Titanium dimethyacrylate oxyacetate; 2,2,4-Trimethyl-1,2-dihydro-quinoline polymer; Tris(nonylphenyl)phosphite. Preferably, the antioxidant used is octadecyl 3,5-Ditert-butyl-4-hydroxyhydrocinnamate.

An optional crosslinking agent can be added to each formula to crosslink the binder to improve waterfastness. Crosslinkers suited for this application including, but not limited to, aziridine (ie., Ionac PFAZ-322), aziridine derivatives, multifunctional aziridines (XAMA-7 (Sybron)) Sancure 777 (Noveon), and melamine (ie., Cymul 323 EvCo, Inc.), and organometallics like an organic titanate such as Tyzor LA (DuPont).

The self-crosslinkable polymer binder-containing image receiving formulation may further include dye retention aids, such as a cationic polymer. Other dye retention aids include the silica listed above, the polyamide copolymer and PVA. The cationic polymer may be incorporated in amounts of 1-10% by weight, preferably 1-4% by weight based upon the dry solids content of the layer. Other dye retention aids may include any salt with dissociative properties. Exemplary, but non-limitive examples include salts with Group II elements such as Mg, CA, Sr or Ba, or other elements such as Al, Zn, and Cu. Preferably $CaCl_2$ may be utilized as a dye retention aid. The salt with dissociative properties may be present in amounts of 0.25-4%, preferably 1-2% by weight based upon the dry weight of the formulation. The cationic polymer may be, for example, an amide-epichlorohydrin polymer, polyacrylamides with cationic functional groups, polyethyleneimines, polydiallylamines, and the like.

Representative cationic polymers used as a dye retention aid include:

Cationic Polymer A

Cationic Polymer A is APC-M1, a polydiallylmethylamine hydrochloride resin from Advanced Polymers, Inc. APC-M1 is a 60% solids dispersion in water with a molecular weight of 20,000.

Cationic Polymer B

Cationic Polymer B is APC-J81, a dimethyldiallylammonium chloride/acrylamide copolymer from Advanced Polymers, Inc. APC-J81 is a 25% solids dispersion in water with a molecular weight of 200,000.

Cationic Polymer C

Cationic Polymer C is APC-A1, a dimethyldiallylammonium chloride/sulfur dioxide copolymer from Advanced Polymers, Inc. APC-A1 is a 24% solids dispersion in water with a molecular weight of 5,000.

Cationic Polymer D

Cationic Polymer D is CP 7091 RV, a poly(diallyldimethylammonium chloride-co-diacetone acrylamide) from ECC International.

When a cationic polymer is present, a compatible binder should be selected, such as a nonionic or cationic dispersion or solution. As is well known in the paper coating art, many commercially available binders have anionically charged particles or polymer molecules. These materials are generally not compatible with the cationic polymer which may be used in the image receiving layer.

The image receiving layer may contain the addition of filler agents with the purpose of opacifying and modulating the surface characteristics of the present invention. The surface roughness and coefficient of friction may need to be modulated depending on such factors as desired surface gloss and the imaging device's specific paper feeding requirements. The filler can be selected from a group of polymers such as, for example, polyacrylates, polyacrylics, polyethylene, polyethylene acrylic copolymers and polyethylene acrylate copolymers, vinyl acetate copolymers and polyvinyl polymer blends that have various particle dimensions and shapes. Typical particle sizes may range from 0.1 to 500 microns. Preferably, the particle sizes range from 5 to 100 microns. More preferably, the particle sizes range from 5 to 30 microns. The filler may also be selected from a group of polymers such as, for example, cellulose, hydroxycellulose, starch and dextran. Silicas and mica may also be selected as a filler. The filler is homogeneously dispersed in the image receiving layer in concentrations ranging from 0.1 to 50%. Preferably, the filler concentration range is 1 to 10 percent. The filler may also be an inorganic pigment such as titanium dioxide.

The image receiving layer may also contain viscosity modifiers and anti-foaming agents. An example of a viscosity modifier is a Laponite product by Southern Clay Products, Inc., Gonzales, Tex.; or Alcogum® L-520 (Alco Chemical).

7. Optional Antistatic Layer

An antistatic layer may be coated on the back of the support opposite the melt transfer layer. Any suitable antistatic layer known in the art may be used as the antistatic layer of the present invention. In accordance with one embodiment of the invention, the support is usable in a laser copier or laser printer. A preferred support for this embodiment is equal to or less than approximately 4.0 mils thick. The antistatic layer according to the present invention may have a solution viscosity of from 0.1 to 20 cP, preferably 1-5 cP, most preferably about 2 cP, as measured on a Brookfield DV-I+viscometer, LV1 spindle at 60 rpm at a temperature of 25° C. Additionally, the antistatic layer may be wet coated in an amount of from 1 g/m.sup.2 to 50 g/m.sup.2, preferably from 10-30 g/m.sup.2, most preferably about 18 g/m.sup.2. The surface tension of the antistatic layer may be from 30-110 dynes/cm, preferably from 50-90 dynes/cm, most preferably about 70 dynes/cm as measured at room temperature.

Since the support is useable in a laser copier or laser printer, antistatic agents may be present. The antistatic agents may be present in the form of a coating on the back surface of the support as an additional layer. The back surface of the support is the surface that is not previously coated with the melt transfer layer.

When the antistatic agent is applied as a coating onto the back surface of the support, the coating will help eliminate copier or printer jamming by preventing the electrostatic adhesion of the paper base to the copier drum of laser and electrostatic copiers and printers. Antistatic agents, or "antistats" are generally, but not necessarily, conductive polymers that promote the flow of charge away from the paper. Antistats can also be "humectants" that modulate the level of moisture in a paper coating that affects the build up of charge. Antistats are commonly charged tallow ammonium compounds and complexes, but also can be complexed organometallics. Antistats may also be charged polymers that have a similar charge polarity as the copier/printer drum; whereby the like charge repulsion helps prevent jamming.

Antistatic agents include, by way of illustration, derivatives of propylene glycol, ethylene oxide-propylene oxide block copolymers, organometallic complexes such as titanium dimethylacrylate oxyacetate, polyoxyethylene oxide-polyoxypropylene oxide copolymers and derivatives of cholic acid.

More specifically, commonly used antistats include those listed in the Handbook of Paint and Coating Raw Materials, such as t-Butylaminoethyl methacrylate; Capryl hydroxyethyl imidazoline; Cetethyl morpholinium ethosulfate; Cocoyl hydroxyethyl imidazoline Di(butyl, methylpyrophosphato) ethylenetitanate di(dioctyl, hydrogen phosphite); Dicyclo(dioctyl)pyrophosphato; titanate; Di(dioctylphosphato)ethylene titanate; Dimethyl diallyl ammonium chloride; Distearyldimonium chloride; N,N'-Ethylene bis-ricinoleamide; Glyceryl mono/dioleate; Glyceryl oleate; Glyceryl stearate; Heptadecenyl hydroxyethyl imidazoline; Hexyl phosphate; N(beta.-Hydroxyethyl)ricinoleamide; N-(2-Hydroxypropyl)benzenesulfonamide; Isopropyl-4-aminobenzenesulfonyl di(dodecylbenzenesulfonyl)titanate; Isopropyl dimethacryl isostearoyl titanate; isopropyltri(dioctylphosphato)titanate; Isopropyl tri(dioctylpyrophosphato)titanate; Isopropyl tri(N ethylaminoethylamino)titanate; (3-Lauramidopropyl)trimethyl ammonium methyl sulfate; Nonyl nonoxynol-15; Oleyl hydroxyethylimidazoline; Palmitic/stearic acid mono/diglycerides; PCA; PEG-36 castor oil; PEG-10 cocamine; PEG-2 laurate; PEG-2; tallowamine; PEG-5 tallowamine; PEG-15 tallowamine; PEG-20 tallowamine; Poloxamer 101; Poloxamer 108; Poloxamer 123; Poloxamer 124; Poloxamer 181; Poloxamer 182; Poloxamer 184; Poloxamer 185; Poloxamer 188; Poloxamer 217; Poloxamer 231; Poloxamer 234; Poloxamer 235; Poloxamer 237; Poloxamer 282; Poloxamer 288; Poloxamer 331; Poloxamer 333; Poloxamer 334; Poloxamer 335; Poloxamer 338; Poloxamer 401; Poloxamer 402; Poloxamer 403; Poloxamer 407; Poloxamine 304; Poloxamine 701; Poloxamine 704; Poloxamine 901; Poloxamine 904; Poloxamine 908; Poloxamine 1107; Poloxamine 1307; Polyamide/epichlorohydrin polymer; Polyglyceryl-lo tetraoleate; Propylene glycol laurate; Propylene glycol myristate; PVM/MA copolymer; polyether; Quaternium-18; Slearamidopropyl dimethyl-.beta.-hydroxyethyl ammonium dihydrogen phosphate; Stearamidopropyl dimethyl-2-hydroxyethyl ammonium nitrate; Sulfated peanut oil; Tetra (2, diallyoxymethyl-1 butoxy titanium di(di-tridecyl) phosphite; Tetrahydroxypropyl ethylenediamine; Tetraisopropyl di(dioctylphosphito)titanate; Tetraoctyloxytitanium di(ditridecylphosphite); Titanium di(butyl, octyl pyrophosphate)di(dioctyl, hydrogen phosphite)oxyacetate; Titanium di(cumylphenylate)oxyacetate; Titanium di(dioctylpyrophosphate)oxyacetate; Titanium dimethacrylate oxyacetate.

Preferably, Marklear AFL-23 or Markstat AL-14, polyethers available from Whitco Industries, are used as an antistatic agents.

The antistatic coating may be applied on the back surface of the support by, for example, spreading a solution comprising an antistatic agent (i.e., with a metering rod) onto the back surface of the support and then drying the support.

An example of one support of the present invention is Georgia Pacific brand Microprint Laser Paper. However, any non-woven cellulosic or film support may be used as the support in the present invention.

B. Application of Layers

The various layers of the transfer material are formed by known coating techniques, such as by curtain coating, Meyer rod, roll, blade, air knife, cascade and gravure coating procedures. In addition, it is also possible to apply the melt transfer layer by extrusion coating or lamination.

In referring to FIG. 1, there is generally illustrated a cross-sectional view of one embodiment of the transfer sheet of the present invention. The support 21 comprises a top and bottom surface. On the top surface of the support is the barrier layer 22. On top of the barrier layer is the melt transfer layer 23. On top of the melt transfer layer is the image receiving layer 24. The image 25 is placed over the image receiving layer 24 on the side opposite the support material. An optional anti-static 26 layer may be coated on the bottom surface of the support 21.

The melt transfer layer may either be extrusion coated or laminated onto the barrier layer. These are performed by methods conventional in the art.

C. Receptor Element

The receptor or receiving element receives the transferred image. A suitable receptor includes but is not limited to textiles including cotton fabric, and cotton blend fabric. The receptor element may also include glass, metal, wool, plastic, ceramic or any other suitable receptor. Preferably the receptor element is a tee shirt or the like.

The image, as defined in the present application may be applied in any desired manner. For example, the image may be formed by a color or monochrome laser printer, laser copier, bubblejet printer, inkjet printer, and the like. The image may also be applied using commercial printing methods such as sheet-fed offset, screen and gravure printing methods or with crayons or markers.

To transfer the image, several alternatives exist. For instance, the transfer material may be first imaged. Then, the imaged image receiving layer and melt transfer layer are peeled away from the support material and placed preferably image side up, melt transfer layer down, against a receptor element.

Alternatively, the image receiving layer and melt transfer layer may be first peeled away from the support layer. Then, the peeled image receiving layer and melt transfer layer may be imaged, with the image being applied to the image receiving layer side of the peeled material. Then, the imaged image receiving layer and melt transfer layer are placed preferably image side up, melt transfer layer down, against a receptor element.

Alternatively, imaging step can wait until after the peeled image receiving layer and melt transfer layer are placed upon the receptor. In this alternative, the image receiving layer and melt transfer layer are preferably placed melt transfer layer down.

Alternatively, after an imaged image receiving layer and melt transfer layer are placed upon the receptor element, additional imaging may occur.

Alternatively, when one or more opaque layers is present between the melt transfer layer and the image receiving layer, the combination of the melt transfer layer, one or more opaque layer, and image receiving layer may first be optionally imaged and peeled from the support. Or the combination of the melt transfer layer, one or more opaque layer, and image receiving layer may be separately, without a support and then optionally imaged. Or, after an optionally imaged image receiving layer, one or more opaque layer and melt transfer layer are placed upon the receptor element, additional imaging may occur.

After the image receiving layer and melt transfer layer (or possibly the image receiving layer, one or more opaque layer and melt transfer layer) are placed on the receptor element, whether they are imaged or not, the next step is that a heat source, for instance a hand iron, a heat press or an oven is used to apply heat to the top imaged surface which in turn releases the image. If a hand iron or heat press is used that is not made of a tack-free material (such that the imaged material layer will stick thereto), a non-stick sheet should be placed between the heat source and the imaged material. However, even if the heat source, be it a hand iron or heat press, is made of a tack-free material, a non-stick sheet may still be placed between the heat source and the imaged material.

Alternatively, heat may be applied to the back surface of the receptor element. In this alternative there is no need for a tack-free sheet regardless of the heat source used.

The temperature transfer range of the hand iron is generally in the range of 110 to 220° C. with about 190° C. being the preferred temperature. The heat press operates at a temperature transfer range of 100 to 220° C. with about 190° C. being the preferred temperature. Lastly, if a conventional oven is used, the temperature should be set within the range of 110 to 220° C. with about 190° C. being the preferred temperature In the hand iron or heat press transfer, the heat source is preferably placed over the imaged side of peeled image receiving layer and melt transfer layer. However, as indicated above, the hand iron or heat press may be applied to the side of the receptor element opposite the peeled layer. With a hand iron, the iron is preferably moved in a circular motion. Pressure (i.e., typical pressure applied during ironing) should be applied as the heating device is moved over the support (see FIG. 2). For a 8.5.times.11 (US Letter) inch web, heat is applied for about two minutes to five minutes (with about three minutes being preferred) using a hand iron and 10 seconds to 50 seconds using a heat press (with about twenty seconds being preferred) of heat and pressure, the transfer should be complete. The heating time requirement may be proportionally shorter or longer depending on the web size. The optional non-stick sheet is removed either prior to cooling or after cooling. The non-stick sheet is not required if the heating device is made of a non-stick material.

Figure 2:
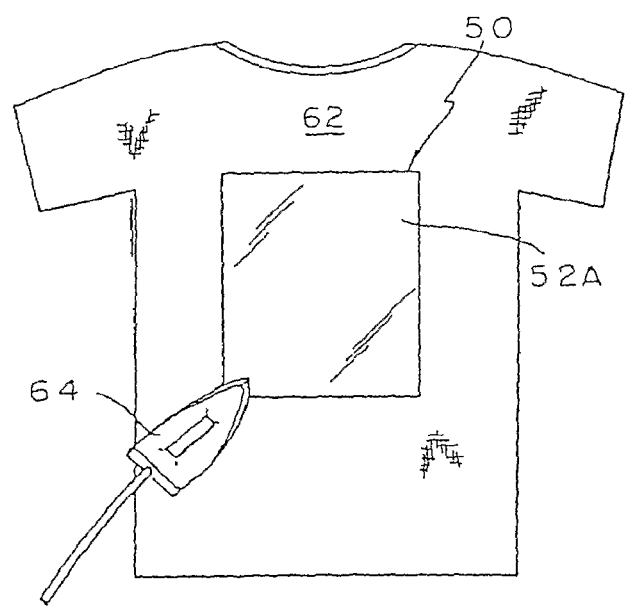

Referring to FIG. 2, the method of applying an image to a receptor element will be described. More specifically, FIG. 2 illustrates how the step of heat transfer from the transfer sheet 50 to a tee shirt or fabric 62 may be performed. A tee shirt 62 is laid flat, as illustrated, on an appropriate support surface, and the optionally imaged surface of the peeled image receiving layer and melt transfer layer is preferably positioned up and away from the tee shirt. A non-stick layer is then placed on top of the peeled imaged material. An iron 64 set at its highest heat setting is run and pressed across the non-stick sheet. The image is transferred to the tee shirt and the non-stick sheet is removed and discarded or saved for reuse. The non-stick sheet is not required if the heating device is made of a non-stick material.

The non-stick sheet is any non-stick or tack-free sheet in the art including but not limited to a silicone sheet, a sheet coated with a barrier layer according to the present invention, or a substrate or support sheet.

In a preferred embodiment, the method of ironing as described in U.S. Pat. No. 6,539,652, which is herein incorporated by reference, can be used.

The following examples are provided for a further understanding of the invention, however, the invention is not to be construed as limited thereto.

EXAMPLES

Example 1

In one embodiment of the invention, the melt transfer layer is an ethylene acrylic acid co-polymer. An example of this embodiment is Melt Transfer Layer Formulation 1:

| Melt Transfer Layer Formulation 1 | |
| --- | --- |
| Components | Parts by weight |
| Ethylene Acrylic Acid Co-polymer Dispersion (Michem Prime 4983R, Michelman) | 86 parts |
| Elastomeric emulsion (Hystretch V-29, B F Goodrich) | 5 parts |
| Polyurethane Dispersion (Daotan VTW 1265, Vianova Resins) | 4 parts |
| Polyethylene Glycol (Carbowax Polyethylene Glycol 400, Union Carbide) | 4 parts |
| Polyethylene Glycol Mono ((Tetramethylbutyl) Phenol) Ether (Triton X-100, Union Carbide) | 1 part |

Melt Transfer Layer Formulation 1, as an embodiment of the invention suitable for at least laser copiers and laser printers, is wax free. Melt Transfer Layer Formulation 1 may be prepared as follows: five parts of the elastomer dispersion are combined with eighty-six parts of an ethylene acrylic acid co-polymers dispersion by gentle stirring to avoid cavitation. Four parts of a polyurethane dispersion are then added to the mixture. Immediately following the addition of a polyurethane dispersion, four parts of a polyethylene glycol and one part of an nonionic surfactant (e.g., Triton X-100) are added. The entire mixture is allowed to stir for approximately fifteen minutes at a moderate stir rate (up to but not exceeding a rate where cavitation occurs).

Example 2

This example relates to another melt transfer layer formulation, Melt Transfer Layer Formulation 2.

| Melt Transfer Layer Formulation 2 | |
| --- | --- |
| Components | Parts |
| Etbylene Acrylic Acid Co-polymers dispersion (Michem Prime 4938R, Michelman) | 74 parts (weight) |
| Wax Dispersion (Michelman 73635M, Michelman) | 25 parts (weight) |

Melt Transfer Layer Formulation 2 may be prepared in the following manner: the ethylene acrylic acid co-polymer dispersion and the wax dispersion are stirred (for example in a beaker with a stirring bar).

Example 3

This example relates to another melt transfer layer formulation, Melt Transfer Layer Formulation 3.

| Melt Transfer Layer Formulation 3 | |
| --- | --- |
| Components | Parts |
| Heat-activated Polyurethane Dispersion (Neorez R-551 (Avecia Co.) | 100 Parts |

Example 4

This example relates to another melt transfer layer formulation, Melt Transfer Layer Formulation 4.

| Melt Transfer Layer Formulation 4. | |
| --- | --- |
| Components | Parts |
| Polyurethane (Estane ™ 5703 TPU, (Noveon ™)) | 100 Parts |

Example 5

This example relates to another melt transfer layer formulation, Melt Transfer Layer Formulation 5.

| Melt Transfer Layer Formulation 5 | |
| --- | --- |
| Components | Parts |
| Polyolefin-polyamide Copolymer (Vestamelt 432 (Degussa Co.) | 100 Parts |

Melt Transfer Layer Formulation 5 may be prepared by applying the copolymer powder to the support under a sintering temperature of 200° C. The final dry basis weight was 20 g/m$^2$.

Example 6

This example relates to another melt transfer layer formulation, Melt Transfer Layer Formulation 6.

| Melt Transfer Layer Formulation 6 | |
| --- | --- |
| Components | Parts |
| Polyethylene Powder (Icotex 520-5016 (Icopolymers Co.) | 100 Parts |

Melt Transfer Layer Formulation 6 may be prepared by applying the polyethylene powder to the support under a sintering temperature of 200° C. The final dry basis weight was 20 g/m.sup.2.

Example 7

This example relates to an image receiving layer formulation, Image Receiving Layer Formulation 1.

| Image Receiving Layer Formulation 1 | |
| --- | --- |
| Components | Parts |
| Ethylene Acrylic Copolymer (Rhoplex NW-1402 (Rohm and Haas)) | 95 Parts |
| Cationic Polymer (APC-M1, Advanced Polymers, Inc.) | 5 Parts |

Image Receiving Layer Formulation 1 may be prepared by mixing parts cationic polymer dispersion to 95 parts ethylene acrylic co-polymer dispersion by gentle stirring.

Example 8

This example relates to another image receiving layer formulation, Image receiving layer Formulation 2.

| Image Receiving Layer Formulation 2 | |
| --- | --- |
| Components | Parts |
| Ethylene Acrylic Copolymer (Rhoplex NW-1402 (Rohm and Haas)) | 92 Parts |
| Cationic Polymer (APC-J81, Advanced Polymers, Inc.) | 8 Parts |

Image Receiving Layer Formulation 2 may be prepared by mixing 8 parts cationic polymer dispersion to 92 parts ethylene acrylic co-polymer dispersion by gentle stirring.

Example 9

This example relates to another image receiving layer formulation, Image receiving Layer Formulation 3.

| Image Receiving Layer Formulation 3 | |
| --- | --- |
| Components | Parts |
| Ethylene Acrylic Copolymer (Rhoplex NW-1402 (Rohm and Haas)) | 60 Parts |
| Polyethylene Wax (Michem Emulsion 58035, (Michelman, Inc.) | 37 Parts |
| Cationic Polymer (APC-J81, Advanced Parts Polymers, Inc.) | 3 Parts |

Image Receiving Layer Formulation 3 may be prepared by mixing 3 parts cationic polymer dispersion to 60 parts ethylene acrylic co-polymer dispersion by gentle stirring. 37 parts of a polyethylene wax dispersion is then mixed into the formulation by gentle stirring.

Example 10

This example relates to another image receiving layer formulation, Image Receiving Layer Formulation 4

| Image Receiving Layer Formulation 4 | |
| --- | --- |
| Components | Parts |
| Ethylene Acrylic Copolymer (Rhoplex NW-1402 (Rohm and Haas)) | 60 Parts |
| Polyethylene Wax (Michem Emulsion 58035, (Michelman, Inc.) | 37 Parts |
| Cationic Polymer (APC-M1, Advanced Polymers, Inc.) | 3 Parts |

Image Receiving Layer Formulation 4 may be prepared by mixing 3 parts cationic polymer dispersion to 60 parts ethylene acrylic co-polymer dispersion by gentle stirring. 37 parts of a polyethylene wax dispersion is then mixed into the formulation by gentle stirring.

Example 11

This example relates to another image receiving layer formulation, Image Receiving Layer Formulation 5.

| Image Receiving Layer Formulation 5 | |
| --- | --- |
| Components | Parts |
| Water | 89 Parts |
| Cationic Polymer (APC-J81, Advanced Polymers, Inc.) | 8 Parts |
| Calcium Chloride | 2 Parts |
| Poly(ethylene oxide) (Polyox WSR N60K (Dow Chemical Co.)) | 1 Part |

Image Receiving Layer Formulation 5 may be prepared by mixing 8 parts cationic polymer dispersion to 89 parts water by gentle stirring. Two parts calcium chloride and 1 part poly(ethylene oxide) are likewise dispersed into the water solution by gentle stirring.

Example 12

This example relates to another image receiving layer formulation, Image Receiving Layer Formulation 6.

| Image Receiving Layer Formulation 6 | |
| --- | --- |
| Components | Parts |
| Ethylene Acrylic Copolymer (Michem Prime 4990 (Michelman, Inc.)) | 80 Parts |
| Wax Dispersion (Michem Emulsion 58035 (Michelman, Inc.) | 20 Parts |

Image Receiving Layer Formulation 6 may be prepared by mixing 20 parts wax dispersion to 80 parts ethylene acrylic co-polymer dispersion by gentle stirring.

Example 13

This example relates to another image receiving layer formulation, Image Receiving Layer Formulation 7.

| Image Receiving Layer Formulation 7 | |
| --- | --- |
| Components | Parts |
| Water | 83 Parts |
| Cationic Polymer (APC-J81, Advanced Polymers, Inc.) | 8 Parts |
| Polyvinyl Alcohol (Celvol 540, Celanese Co) | 5 Parts |
| Calcium Chloride | 2 Parts |
| Poly(ethylene oxide) (Polyox WSR N60K (Dow Chemical Co.)) | 1 Part |
| Glyoxal (Aldrich) | 1 Part |

Image Receiving Layer Formulation 7 may be prepared by mixing 8 parts cationic polymer dispersion to 83 parts water by gentle stirring. Five parts polyvinyl alcohol is then dispersed via gentle stirring and heating. Once the solution cools back to room temperature, two parts calcium chloride and 1 part poly(ethylene oxide) are likewise dispersed into the water solution by gentle stirring. One part glyoxal is then stirred into the mixture via gentle stirring.

Example 14

This example relates to an image receiving layer formulation, Image Receiving Layer Formulation 8.

| Image Receiving Layer Formulation 8 | |
| --- | --- |
| Components | Parts |
| Ethylene Acrylic Copolymer(Rhoplex B-15 (Rohm and Haas)) | 94 Parts |
| Cationic Polymer (APC-M1, Advanced Polymers, Inc.) | 5 Parts |
| Multifunctional Aziridine Crosslinker (XAMA-7, Sybron Co) | 1 Part |

Image Receiving Layer Formulation 8 may be prepared by mixing 5 parts cationic polymer dispersion and 1 part aziridine crosslinker to 94 parts ethylene acrylic co-polymer dispersion by gentle stirring.

Example 15

This example relates to an image receiving layer formulation, Image Receiving Layer Formulation 9.

| Image Receiving Layer Formulation 9 | |
| --- | --- |
| Components | Parts |
| Ethylene vinyl acetate Copolymer (Dur-o-set Elite Plus 25-299A (Vinamul)) | 60 Parts |
| Polyethylene Wax (Michem Emulsion Fglass X9M, (Michelman, Inc.) | 37 Parts |
| Cationic Polymer (APC-M1, Advanced Polymers, Inc.) | 3 Parts |

Image Receiving Layer Formulation 9 may be prepared by mixing 3 parts cationic polymer dispersion to 60 parts ethylene acrylic co-polymer dispersion by gentle stirring. 37 parts of a polyethylene wax dispersion is then mixed into the formulation by gentle stirring.

Example 16

This example relates to an image receiving layer formulation, Image Receiving Layer Formulation 10.

| Image Receiving Layer Formulation 10 | |
| --- | --- |
| Components | Parts |
| Ethylene vinyl acetate Copolymer (Dur-o-set Elite Plus 25-299A (Vinamul)) | 60 Parts |
| Water | 37 Parts |
| Cationic Polymer (APC-M1, Advanced Polymers, Inc.) | 3 Parts |

Image Receiving Layer Formulation 10 may be prepared by mixing 3 parts cationic polymer dispersion to 60 parts ethylene acrylic co-polymer dispersion by gentle stirring. Thirty-seven parts of water is then added under gentle stirring.

Example 17

This example relates to an image receiving layer formulation, Image Receiving Layer Formulation 11.

| Image Receiving Layer Formulation 11 | |
| --- | --- |
| Components | Parts by weight (DRY) |
| Polyquaternium-10 (Celquat SC-230M; National Starch Co.) | 0.15 parts |
| Self-crosslinking EVA polymer (Duroset Elite Plus 25-299A; Vinamul Polymers Corp.) | 15 Parts |
| Cationic Polymer (APC-M1; Advanced Polymer Inc.) | 1.8 parts |
| Nylon 6-12 (Orgasol 3501 EXDNAT 1; Atofina) | 8 parts |
| EVA (Microthene FE-532; Equistar Chem. Co) | 10 parts |
| Silica (Syloid W-500; Grace Davidson) | 15 parts |

Image Receiving Layer Formulation 11 is displayed in dry weights. However, some of these ingredient correspond to wet amounts added to create the formulation. These wet amounts by weight are found below:

| Components | Parts by weight (WET) |
| --- | --- |
| Polyquaternium-10 (Celquat SC-230M; National Starch Co.) | n/a |

-continued

| Components | Parts by weight (WET) |
|---|---|
| Self-crosslinking EVA polymer (Duroset Elite Plus 25-299A; Vinamul Polymers Corp.) | 30 (50% solids) |
| Water | 70 |
| Cationic Polymer (APC-M1; Advanced Polymer Inc.) | 3 (60% solids) |
| Nylon 6-12 (Orgasol 3501 EXDNAT 1; Atofina) | n/a |
| EVA (Microthene FE-532; Equistar Chem. Co) | n/a |
| Silica (Syloid W-500; Grace Davidson) | n/a |

Example 18

This example relates to an image receiving layer formulation, Image Receiving Layer Formulation 12.

| Image Receiving Layer Formulation 12 | |
|---|---|
| Components | Parts by weight (DRY) |
| 29% Orgasol ® 3501 EXDNAT Polyamide Resin (Atofina Chemicals, Inc. | 9.6 Parts |
| 20% EVA (Microthene FE-532; Equistar Chem. Co) | 10 Parts |
| Self-crosslinking EVA polymer (Duroset Elite Plus 25-299A; Vinamul Polymers Corp.) | 15 Parts |
| Cationic Polymer (APC-M1; Advanced Polymer Inc.) | 1.8 Parts |
| Silica (Syloid W-500; Grace Davidson) | 15 Parts |
| Alcogum ® L-520 (Alco Chemical) | 0.6 Parts |

Image Receiving Layer Formulation 12 is displayed in dry parts by weights. However, some of the above ingredients correspond to wet amounts added to create the formulation. To prepare, first two stock solutions are prepared in water. These are as follows:

| 29% Orgasol 3501 EXDNAT 1 | | |
|---|---|---|
| Water | 100 | parts |
| Triton X-100 | 3 | parts (surfactant) |
| Orgasol 3501 | 30 | parts |
| 20% Microthene | | |
| Water | 100 | parts |
| Triton X-100 | 1 | part |
| Microthene FE-532 | 20 | parts |

These ingredients are then mixed with the other ingredients shown above. The mixing is performed wet, and the amounts in Wet parts by weight are shown below:

| Components | Parts by weight (WET) |
|---|---|
| 29% Orgasol ® 3501 EXDNAT Polyamide Resin (Atofina Chemicals, Inc. | 33 |
| 20% EVA (Microthene FE-532; Equistar Chem. Co) | 50 |
| Self-crosslinking EVA polymer (Duroset Elite Plus 25-299A; Vinamul Polymers Corp.) | 30 (50% solids) |
| Cationic Polymer (APC-M1; Advanced Polymer Inc.) | 3 (60% solids) |
| Silica (Syloid W-500; Grace Davidson) | n/a |
| Alcogum .RTM. L-520 (Alco Chemical) | 3 (20% solids) |

Example 19

This example relates is the same as Image Receiving Layer Formulation 12 of Example 18, with the exception that the parts by weight of certain components are modified, the Alcogum® L-520 (Alco Chemical) is absent and Laponite, a defoamer and an antioxidant have been added.

| Image Receiving Layer Formulation 13 | |
|---|---|
| Components | Parts by weight (DRY) |
| 29% Orgasol ® 3501 EXDNAT Polyamide Resin (Atolina Chemicals, Inc. | 9.7 Parts |
| 20% EVA (Microthene FE-S32; Equistar Chern. Co) | 10 Parts |
| Self-crosslinking EVA polymer (Duro set Elite Plus 25-299A; Vinamul Polymers Corp.) | 20 Parts |
| Cationic Polymer (APC-Ml; Advanced Polymer Inc.) | 2 Parts |
| Silica (Syloid W-500; Grace Davidson) | 11 Parts |
| Laponite | 0.8 Parts |
| Defoamer | 0.1 Parts |
| Antioxidant | 0.5 Parts |

Example 20

A transfer sheet according to the present invention is prepared as follows:

A support layer is first coated with a barrier layer, Barrier Layer Formulation 1, below. Next, a melt transfer layer comprising a terpolymer of ethylene-vinyl acetate and maleic anhydride is extruded onto the barrier layer. Next, an Image Receiving Layer (formulation 12) is applied via a dunk and squeeze application method.

After thermal drying, an image is formed on the side of the image receiving layer opposite the support material by an ink jet printer.

The transfer of the image area from the image transfer sheet is completed by peeling the imaged image receiving layer and melt transfer layer from the support, and placing the peeled material, image side up, on a cotton shirt. Next a non-stick sheet is placed on top of the imaged peeled material and heat and pressure from a conventional iron set on its highest temperature setting is applied through the non-stick sheet for a time sufficient to transfer the image area to the shirt (e.g. 3-5 minutes). Lastly, the non-stick sheet is removed.

Example 21

A transfer sheet according to the present invention is prepared as follows:

Example 20 is repeated except the melt transfer layer is applied by lamination rather than melt extrusion

Example 22

Example 17 is repeated, except that the back surface of the support (opposite the barrier layer) is coated with the following antistatic layer:

Antistatic Layer Solution Formulation 1

| Components | Parts |
| --- | --- |
| Water | 90 parts (by weight) |
| Quaternary ammonium salt solution (Statik-Blok J-2, Amstat Industries) | 10 parts (by weight) |

The antistatic solution is applied in a long line across the top edge of the support material using a #4 metering rod. The coated support is force air dried for approximately one minute. The antistatic solution of this Example has the following characteristics: the solution viscosity as measured on a Brookfield DV-I+viscometer, LV1 spindle @60 RPM is 2.0 (cP) at 24.5° C. The coating weight (wet) was 15 g/m.sup.2. The surface tension is 69.5 dynes/cm at 24° C.

Once the support and antistatic coating are dry, the uncoated side of the support coated with the barrier layer, melt transfer layer and image receiving layer.

Example 23

Example 22 is repeated, except that following formulation is used as the antistatic layer:

Antistatic Layer Solution Formulation 2

| Components | Parts |
| --- | --- |
| Water | 95 parts (by weight) |
| Polyether (Marklear ALF-23, Witco Ind.) | 5 parts (by weight) |

Example 24

A transfer sheet according to the present invention is prepared as follows:

A support layer is first coated with a barrier layer, Barrier Layer Formulation 1, below. Next, a melt transfer layer comprising polyurethane, for instance, Melt Transfer Layer Formulation 4 is applied onto the barrier layer. Next, an Image Receiving Layer (formulation 13) is applied via a dunk and squeeze application method.

After thermal drying, an image is formed on the side of the image receiving layer opposite the support material by an ink jet printer.

The transfer of the image area from the image transfer sheet is completed by peeling the imaged image receiving layer and melt transfer layer from the support, and placing the peeled material, image side up, on a cotton shirt. Next a non-stick sheet is placed on top of the imaged peeled material and heat and pressure from a conventional iron set on its highest temperature setting is applied through the non-stick sheet for a time sufficient to transfer the image area to the shirt (e.g. 3-5 minutes). Lastly, the non-stick sheet is removed.

Example 25

This example relates to a Barrier Layer Formulation 1:

Barrier Layer Formulation 1

| Components | Parts |
| --- | --- |
| Ethylene Acrylic Acid Copolymer (Hycar 26138 (Noveon, Co.) | 100 |

Example 26

An example of optional Opaque Layer A is as follows:

Opaque Layer A Formulation 1

| Ingredient | Parts |
| --- | --- |
| Stryrene-Butadiene Latex (Latex CP 615NA, Dow Chemical Co., Midland, MI) | 40 |
| Pigment in Resin Solution (Arrowvure F. Flink Ink CO., W. Hazelton, PA) | 25 |
| Thermoplastic Elastomer (Hystretch V-29, B F Goodrich, Cleveland, OH) | 17.5 |
| Elastomer (Hycar 1561, B F Goodrich, Cleveland, OH) | 17.5 |

Example 27

An example of optional Opaque Layer B is as follows:

Opaque Layer B Formulation 1

| Ingrediant | Parts |
| --- | --- |
| Vinyl Acetate-Ethylene Copolymer (Airflex 124, Airproducts Inc., Allentown, PA) | 35 |
| TiO2 Powder Pigment (TiPure R706, DuPont Chemicals, Wilmington, DE) | 25 |
| Thermoplastic Elastomer (Hystretch V-29, B F Goodrich, Cleveland, OH) | 25 |
| Elastomer 15 (Hycar 1561, B F Goodrich, Cleveland, OH). | |

Example 28

A transfer sheet according to the present invention is prepared as follows:

A support layer is first coated with Barrier Layer Formulation 1. Next, a melt transfer layer comprising polyurethane, for instance, Melt Transfer Layer Formulation 4 is applied onto the barrier layer. Next, at least one opaque layer, for instance, Opaque Layer A Formulation 1 and/or Opaque Layer B Formulation 1 is/are applied over the Melt Transfer Layer. Next, an Image Receiving Layer (formulation 13) is applied via a dunk and squeeze application method over the Opaque Layer.

After thermal drying, the Melt Transfer Layer, Opaque Layer A and/or Opaque Layer B, and the Image Receiving Layer are peeled from the barrier-coated support. An image is then formed on the image receiving layer.

The transfer of the image area from the image transfer sheet is placing the peeled material, image side up, on a cotton shirt.

Next a non-stick sheet is placed on top of the imaged material and heat and pressure from a conventional iron set on its highest temperature setting is applied through the non-stick sheet for a time sufficient to transfer the image area to the shirt (e.g. 3-5 minutes). Lastly, the non-stick sheet is removed.

All cited patents, publications, copending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image transfer article, comprising:
    a melt transfer layer having a top surface and a bottom surface, the bottom surface positionable against a receptor element during a transfer process;
    an image receiving layer having an image receiving surface configured to receive indicia or an image; and
    at least one opaque layer disposed between the image receiving layer and the top surface of the melt transfer layer, the at least one opaque layer configured to provide an opaque background for at least a portion of the image and having sufficient thickness and rigidity so that the image transfer article can function independently of a support.

2. The article of claim 1, wherein the opaque background includes a substantially white opacity provided by a white pigment or a substantially colored opacity provided by a colored pigment.

3. The article of claim 2, wherein the white pigment comprises titanium oxide or the colored pigment comprises a pigmented resin.

4. The article of claim 1, wherein the at least one opaque layer comprises a first and a second opaque layer.

5. The article of claim 4, wherein the first opaque layer has a composition that is different from a composition of the second opaque layer.

6. The article of claim 1, wherein the at least one opaque layer as a thickness between about 0.5 mils and about 2.5 mils.

7. An image transfer article, comprising:
    a transfer member comprising (i) a melt transfer layer, (ii) an image receiving layer having an image receiving surface configured to receive indicia or an image, and (iii) at least one opaque layer positioned between the melt transfer layer and the image receiving layer and configured to provide an opaque background to the image and having sufficient thickness and rigidity so that the image transfer article can function independently of a support,
    wherein the image transfer article is configured to transfer the received indicia or image to a receptor element without inversion or reversal of the indicia or image.

8. The article of claim 7, wherein the opaque background includes a substantially white opacity provided by a white pigment or a substantially colored opacity provided by a colored pigment.

9. The article of claim 8, wherein the white pigment comprises titanium oxide or the colored pigment comprises a pigmented resin.

10. The article of claim 7, wherein the at least one opaque layer comprises a first and a second opaque layer.

11. The article of claim 10, wherein the first opaque layer has a composition that is different from a composition of the second opaque layer.

12. The article of claim 7, wherein the at least one opaque layer as a thickness between about 0.5 mils and about 2.5 mils.

* * * * *